US010402216B1

(12) United States Patent
Bell et al.

(10) Patent No.: US 10,402,216 B1
(45) Date of Patent: Sep. 3, 2019

(54) LIVE SUPPORT INTEGRATION IN A VIRTUAL MACHINE BASED DEVELOPMENT ENVIRONMENT

(71) Applicant: INTUIT INC., Mountain View, CA (US)

(72) Inventors: Chad Bell, San Diego, CA (US); Vinay Kumar, San Diego, CA (US); Ryan Lynch, San Diego, CA (US); Joseph Elwell, San Diego, CA (US)

(73) Assignee: INTUIT, INC., Mountain View, CA (US)

( * ) Notice: Subject to any disclaimer, the term of this patent is extended or adjusted under 35 U.S.C. 154(b) by 221 days.

(21) Appl. No.: 15/468,158

(22) Filed: Mar. 24, 2017

(51) Int. Cl.

| | |
|---|---|
| ***G06F 7/04*** | (2006.01) |
| ***G06F 9/455*** | (2018.01) |
| ***G06F 8/60*** | (2018.01) |
| ***G06F 8/30*** | (2018.01) |
| ***H04L 29/06*** | (2006.01) |

(52) U.S. Cl.
CPC ............ *G06F 9/45545* (2013.01); *G06F 8/30* (2013.01); *G06F 8/60* (2013.01); *H04L 63/083* (2013.01)

(58) Field of Classification Search
CPC .......... G06F 9/45545; G06F 8/60; G06F 8/30; H04L 63/083
USPC ............................................................ 726/9
See application file for complete search history.

(56) References Cited

U.S. PATENT DOCUMENTS

2005/0085181 A1* 4/2005 Tao .................. H04L 29/06027 455/1
2009/0222815 A1* 9/2009 Dake ...................... G06F 9/455 718/1

* cited by examiner

*Primary Examiner* — Mohammad W Reza
(74) *Attorney, Agent, or Firm* — Patterson + Sheridan, LLP

(57) ABSTRACT

The present disclosure relates to live support integration in a virtual machine based development environment. According to one embodiment, a method generally includes obtaining, by a virtual machine in the virtual machine based development environment, a token from a secure location. In some embodiments, upon determining, that the token is authentic, the virtual machine determines system configuration information relating to the virtual machine. In certain embodiments, the virtual machine establishes a communication channel with a remote support device using the token. The establishing may comprise transmitting, by the virtual machine, the system configuration information to the remote support device and enabling two-way communication between the virtual machine and the remote support device.

21 Claims, 5 Drawing Sheets

LIVE SUPPORT INTEGRATION IN A VIRTUAL MACHINE BASED DEVELOPMENT ENVIRONMENT

BACKGROUND

Field

Embodiments presented herein generally relate to technical support in software development environments, and more specifically to integrating live support functionality within a virtual machine based development environment.

Description of the Related Art

Development environments generally include various components that are installed on a developer's local computer to allow a developer to modify program components (e.g., source code, graphical user interface (GUI) design, operational parameters, and so on) and test modifications to the program components. These components can include shared libraries used by multiple programs in a development environment, integrated development environment tools (including, for example, compilers, interpreters, debuggers, code editing components, and user interface design tools), source code for projects under development, test versions of services on which projects under development depend, and so on. In some cases, development environments may connect to one or more source code repositories to obtain the source code for a project under development. Modifications to the source code may be performed on a developer's local computer and, after testing, be committed back to the source code repository as a new version of the source code.

Setting up a development environment on a local computer may be a time consuming task. In some cases, setting up a development environment on a local computer may result in conflicts between different versions of shared libraries used by different components in the development environment. These dependency conflicts may, in some cases, break the functionality of one or more software components on a local computer. In such a case, a developer may need to troubleshoot various programs on the local computer to identify and fix problems that arise when the developer sets up a development environment on the local computer. In some cases, dependency conflicts and other issues arising from setting up a development environment on a local computer may be severe enough that fixing the dependency conflicts or other issues may entail restoring the local computer to a previous operating state (e.g., from a backup of the local computer performed before the developer attempted to set up a development environment).

Additionally, when developers independently set up development environments on their own local computers, different developers may use different, and potentially incompatible, versions and configurations of development tools and development projects. Because the development environments deployed on different local computers used by different developers may be different and potentially incompatible, solutions developed to address problems on a single developer's local computer may not be applicable to other developer computers.

Furthermore, it may sometimes be necessary to seek technical support from a support professional if a developer is unable to locally resolve a problem (e.g., a dependency conflict or other configuration issue). Seeking such support may require providing a support professional with detailed information about the state and configuration of the local computer and development environment. This may be an inconvenient and time consuming process, potentially requiring the developer to gather a significant amount of information, contact the support staff (e.g., by creating a support ticket), and await a response from a support professional.

SUMMARY

One embodiment of the present disclosure includes a method for live support integration in a virtual machine based development environment. The method includes obtaining, by a virtual machine in the virtual machine based development environment, a token from a secure location. Upon determining, by the virtual machine, that the token is authentic, the method further includes determining, by the virtual machine, system configuration information relating to the virtual machine. The method further includes establishing, by the virtual machine, a communication channel with a remote support device using the token. The establishing may comprise transmitting, by the virtual machine, the system configuration information to the remote support device and enabling two-way communication between the virtual machine and the remote support device.

Another embodiment provides a computer-readable storage medium having instructions, which, when executed on a processor, performs the method for live support integration in a virtual machine based development environment described above.

Still another embodiment of the present invention includes a processor and a memory storing a program, which, when executed on the processor, performs the method for live support integration in a virtual machine based development environment described above.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Figure 1:
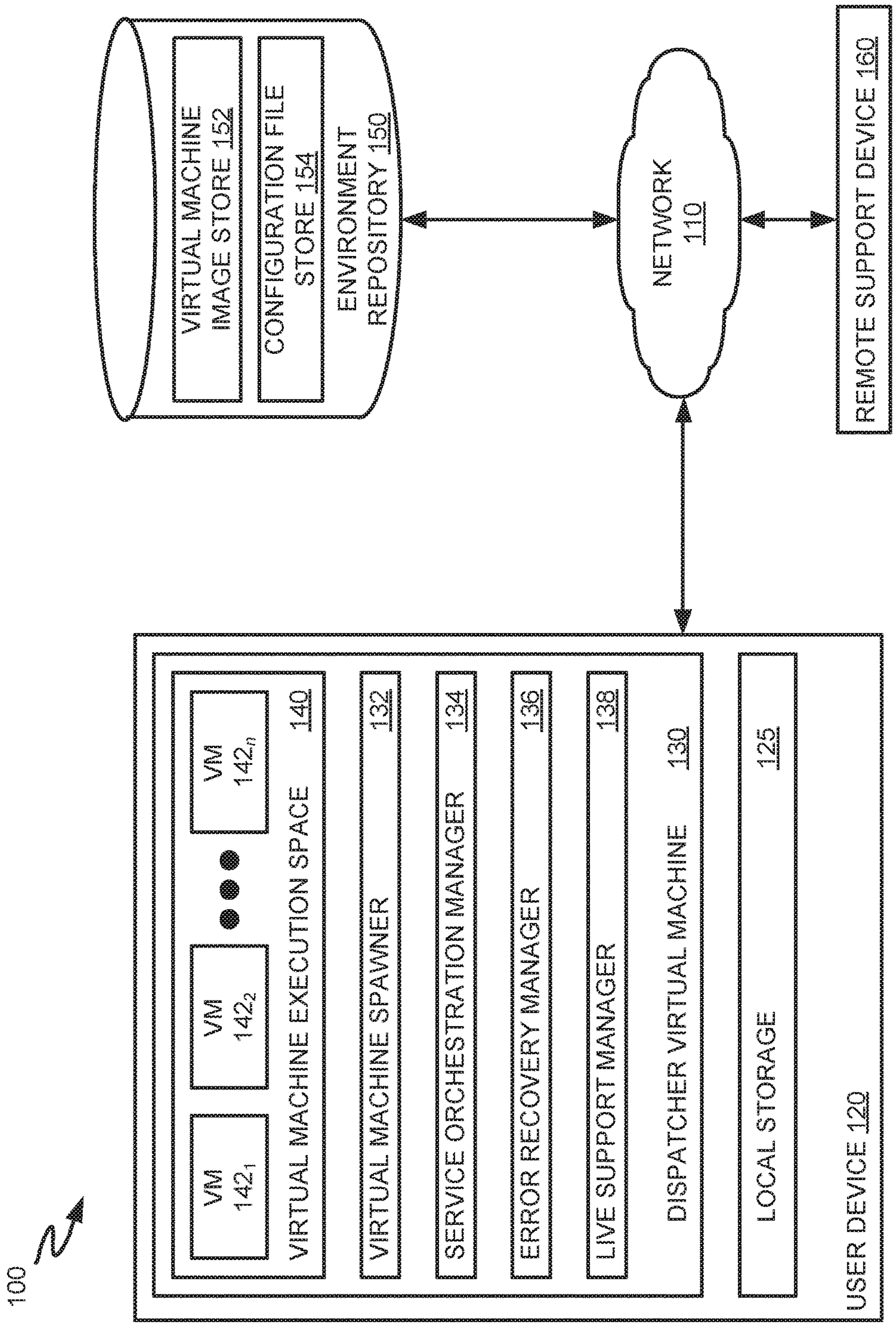
FIG. 1 illustrates an example computing environment, according to one embodiment.

Virtualization generally allows for the use of virtual machines to execute software in an environment segregated from the operating system and hardware executed by a host machine. In a virtualized computing system, a host machine provides execution environments in which one or more virtual machines, or guest systems, execute. The execution environments generally are software constructs that expose hardware functionality to an operating system executing on a virtual machine through emulation of a basic computing system or, in some cases, direct access to various hardware components of the host machine. Each virtual machine executing on a host machine generally stores data on a virtualized hard drive, which may be an emulated storage device that appears to be a hard drive or other storage device to a virtual machine but may be stored as one or more files on the storage devices connected to the host machine (e.g., a local hard drive, removable storage, or network attached storage).

Because virtual machines generally isolate the operations of a guest operating system and the applications deployed thereon from affecting the configuration of a host machine, deploying a development environment using virtual machines may prevent shared libraries deployed on a virtual machine from conflicting with dependencies that exist on a host machine. Additionally, because of the isolation properties of virtual machines, problems that arise within the virtual machine may affect the virtual machine itself (e.g., cause stop errors or other errors that may be fixed by rebooting the virtual machine) but may not adversely affect the functionality of the host machine. Further, host machines may not be adversely affected by corruption or modifications that cause instability in a virtual machine. To remedy such problems, the host machine need not be modified. To fix corruption or stability problems in a virtual machine, the virtual machine can be replaced by overwriting a virtual hard drive file associated with the virtual machine with a new virtual hard drive file.

The properties of virtual machines and virtualization provide a platform for centrally managing development environments using virtual machines. Pre-configured virtual machines may be established for components of a development environment that developers can use to modify and test software under development. For example, some virtual machines may be configured to run test versions of services under development, while other virtual machines may be configured to run stable versions of service dependencies, or services that are used by the software under development. Because these virtual machines may be pre-configured, a user need not perform additional configuration in order to use the development environments provided by these virtual machines, however some developers may modify and customize configuration details. Using these virtual machines, technical and non-technical developers can quickly provision development environment from a plurality of pre-configured virtual machines, and the resulting development environment may be isolated from the developers' local computers and easily maintainable (e.g., through replacement of outdated or malfunctioning virtual machine images with more recent virtual machines or versions of virtual machines that are known to work).

Embodiments of the present disclosure provide techniques for integrating live support within a virtual machine based development environment. Integrating live support may involve establishing a communication channel between the virtual machine based development environment and a remote support device. Such a channel be established using, for example, an application programming interface (API) which allows a communication platform to be integrated within the virtual machine. APIs generally expose methods and procedures that software developers can use to build software applications using features provided by a software system. These features may include, for example, database interaction, data processing, communications, and so on. In some embodiments, for example, API method calls may be employed within the virtual machine based development environment to establish a secure communication channel with a remote support device.

FIG. 1 illustrates an example computing environment for live support integration in a virtual machine-based development environment. As illustrated, computing environment 100 includes a user device 120, an environment repository 150, and a remote support device 160, connected via network 100.

As illustrated, user device 120 includes local storage 125 and a dispatcher virtual machine 130. Local storage 125 may be a hard drive, solid state drive, or other electronic storage on which dispatcher virtual machine 130 and components thereof can store and modify virtual machine images used to provision a development system for a user of user device 120. Local storage 125 may additionally provide a user-accessible storage repository for development project files (e.g., program source code, user interface files, configuration files, and other code components of a development project). As discussed in further detail herein, one or more virtual machines 140 executing within dispatcher virtual machine 130 can access development project files to save changes to program source code on user device 120, test software using program source code saved in local storage 125, and commit tested changes to a source code repository associated with a development project.

Dispatcher virtual machine 130 may be a virtual machine configured to manage the deployment of various components of a development platform on user device 120, according to an embodiment. In managing the deployment of a development platform, dispatcher virtual machine 130 may isolate operation of the various components of a development project from each other and from affecting the configuration of user device 120, as components of the development project may be executed in independent virtual machines within a virtual machine execution space provided by dispatcher virtual machine 130. As illustrated, dispatcher virtual machine includes a virtual machine spawner 132, service orchestration manager 134, error recovery manager 136, and virtual machine execution space 140.

Virtual machine spawner 132 generally obtains virtual machine images from a central repository (e.g., environment repository 150) and spawns virtual machines based on the obtained virtual machine images. In some cases, virtual machine spawner 132 can generate a user interface for display on user device 120 that illustrates the development virtual machines that dispatcher virtual machine 130 can obtain from a central repository and execute in virtual machine execution space 140.

Service orchestration manager 134 generally monitors user selections of the virtual machines to be spawned in virtual machine execution space 140 to determine if service dependencies have been satisfied, according to an embodiment.

Error recovery manager 136 generally monitors the operational status of one or more virtual machines 142 executing in virtual machine execution space 140 for system errors and attempts to automatically rectify system errors.

Live support manager 138 generally handles establishing and utilizing a secure communications channel between dispatcher virtual machine 130 and remote support device 160. The functional components of live support manager 138 are shown in more detail in FIG. 2, described below.

Virtual machines 142 spawned by virtual machine spawner 132 generally execute within virtual machine execution space 140, which provides an isolated container in which each virtual machine 142 executes until a virtual machine 142 is terminated (e.g., shut down). The containers provided by virtual machine execution space 140 generally expose, to a virtual machine 142, a virtualized computer including an input/output system, one or more processors, temporary memory, persistent storage, access to networked storage, and so on. When a user selects a virtual machine 142 for termination, virtual machine 130 can shut down the selected virtual machine 142 and terminate the execution space allocated to the selected virtual machine, which frees up resources that can be allocated to a virtual machine execution space for another virtual machine.

Environment repository 150 generally is a repository that stores files that can be used by dispatcher virtual machine 130 to deploy a development environment. As illustrated, environment repository 150 includes virtual machine image store 152 and configuration file store 154.

Virtual machine image store 152 may include versioned copies of virtual machines associated with one or more development environment virtual machines that can be deployed on user machine via dispatcher virtual machine 130. In some cases, virtual machine image store 152 may comprise independent repositories, with each repository being associated with a specific program deployed on a virtual machine. Virtual machine images stored in virtual machine image store 152 may, in some cases, be versioned, with the version information associated with each version of a virtual machine image indicating whether the virtual machine image represents a virtual machine with the latest stable release of a program, a previous release, or a pre-production release of the program that includes features that are under testing.

Configuration file store 154 generally provides a repository that stores configuration files associated with virtual machine images stored in virtual machine image store 152. As discussed, the configuration files stored in configuration file store 154 may indicate, to virtual machine spawner 132, resources to allocate to an execution space in which virtual machine 142 executes. In some cases, the configuration files stored in configuration file store 154 may further indicate the services that programs executing on a virtual machine 142 depend on. As discussed herein, information about the services that a program depends on may be used by service orchestration manager 134 to verify that the specified services are active and, if not, spawn one or more virtual machines to activate the specified services and connect those services to a virtual machine 142 that is executing the program.

Remote support device 160 generally comprises a computer system operated by a support professional. Remote support device 160 may, for example, be implemented as a physical computing device (e.g. desktop computer, server, mainframe, etc.) or a virtual computing instance (e.g. virtual machine, container, etc.) supported by a physical host. A support professional using remote support device 160 may be able to perform technical support operations for user device 120 over network 110 using a secure communication channel established by live support manager 138.

Figure 2:
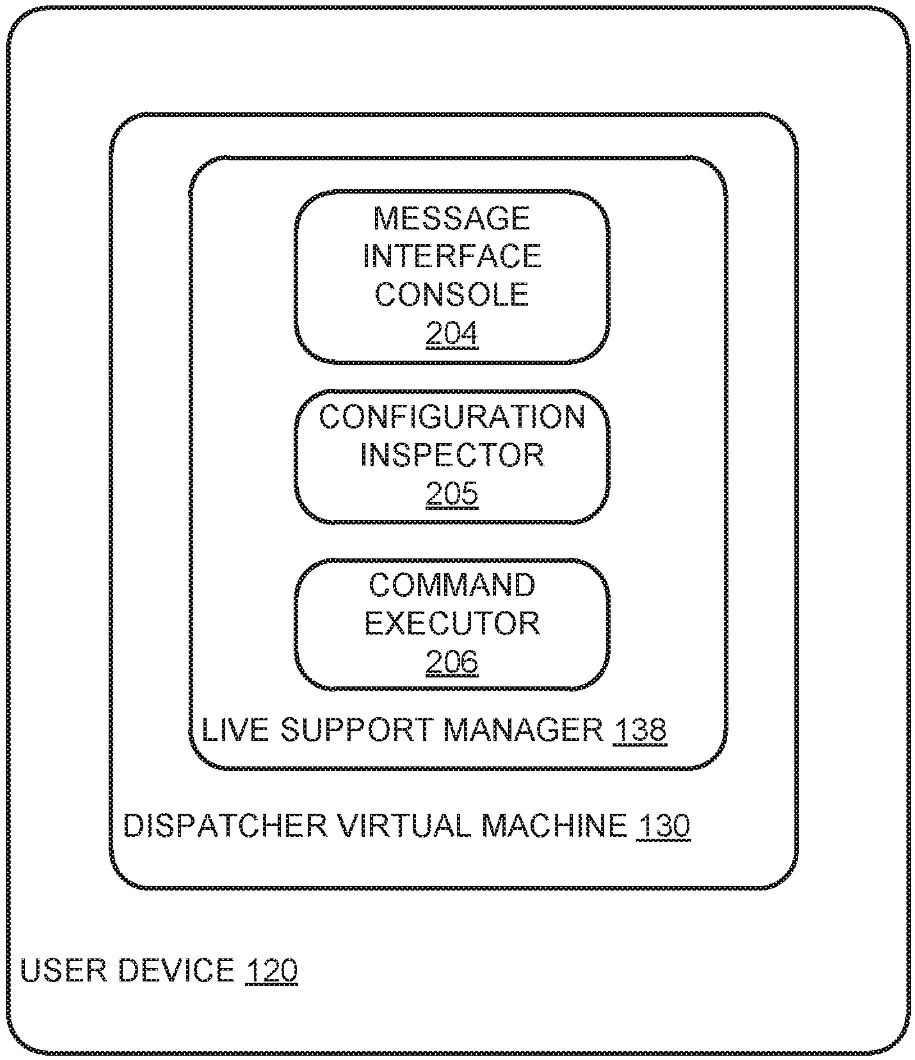
FIG. 2 illustrates an example of a host executing a virtual machine capable of performing the method for live support integration in a virtual machine based development environment as described herein.

FIG. 2 illustrates an example of a user device 120 executing a dispatcher virtual machine 130 capable of performing the method for live support integration in a virtual machine based development environment as described herein.

User device 120 and dispatcher virtual machine 130 may be implemented as described above with respect to FIG. 1. Live support manager 138 may comprise a software entity executing within dispatcher virtual machine 130, and may comprise message interface console 204, configuration inspector 205, and command executor 206. The components shown are merely exemplary, and the functionality of live support manager 138 may be implemented by any number of integrated or distributed components.

Message interface console 204 generally allows for messages to be exchanged with remote support device 160. Message interface console 204 may, for example, initiate a secure communication channel between dispatcher virtual machine 130 and remote support device 160 using a token. The token may, for example, be obtained by message interface console 204 from a secure location (e.g., an encrypted network drive), authenticated (e.g. by providing the token to a separate authentication server), and provided to remote support device 160 for the purpose of establishing an authenticated communication channel. Once the communication channel is established, message interface console 204 may transmit and receive messages over the channel. Messages may, for example, comprise text, images, commands, etc. In some embodiments, message interface console 204 may allow a user of user device 120 to communicate with a support professional at remote support device 160 using, for example, a chat interface integrated within dispatcher virtual machine 130.

In some embodiments, message interface console 204 includes a user interface which allows a user of user device 120 interact with message interface console 204 and view messages. In some cases, message interface console 204 may be configured to determine whether messages received from remote support device 160 include commands to be executed by command executor 206 or messages to be displayed within the user interface of message interface console 204. Message interface console may omit displaying messages determined to include commands to be executed by command executor 206, which may hide details of how a support professional using remote support device 160 is attempting to remedy errors occurring in dispatcher virtual machine 130.

Configuration inspector 205 generally determines configuration information of both dispatcher virtual machine 130 and user device 120. Configuration information may include, for example, operating system versions, development environment versions, memory and CPU utilization, user identifiers, etc. Configuration inspector 205 may determine at least a portion of the configuration information by introspecting into the user device 120 which is the host of dispatcher virtual machine 130. Other portions of the configuration information may be obtained from locally stored configuration files. Configuration information may be provided by configuration inspector 205 to message interface console 204 so that it can be transmitted over the communication channel to remote support device 160. In some embodiments, configuration information is transmitted as part of the process for establishing a communication channel between dispatcher virtual machine 130 and remote support device 160.

Command executor 206 generally executes commands received from remote support device 160. For example, if a support professional using remote support device 160 determines that a configuration file on dispatcher virtual machine 130 should be modified (e.g., because the configuration file is outdated or known to cause errors on user devices 120 with similar hardware and software configurations), a command may be sent from remote support device 160 to live support manager 138. The command may, for example, be received by message interface console 204 and passed to command executor 206. Command executor 206 may execute the command by, for example, modifying a locally stored configuration file as directed by the command. This may allow for technical support to be provided efficiently from remote support device 160.

Figure 3:
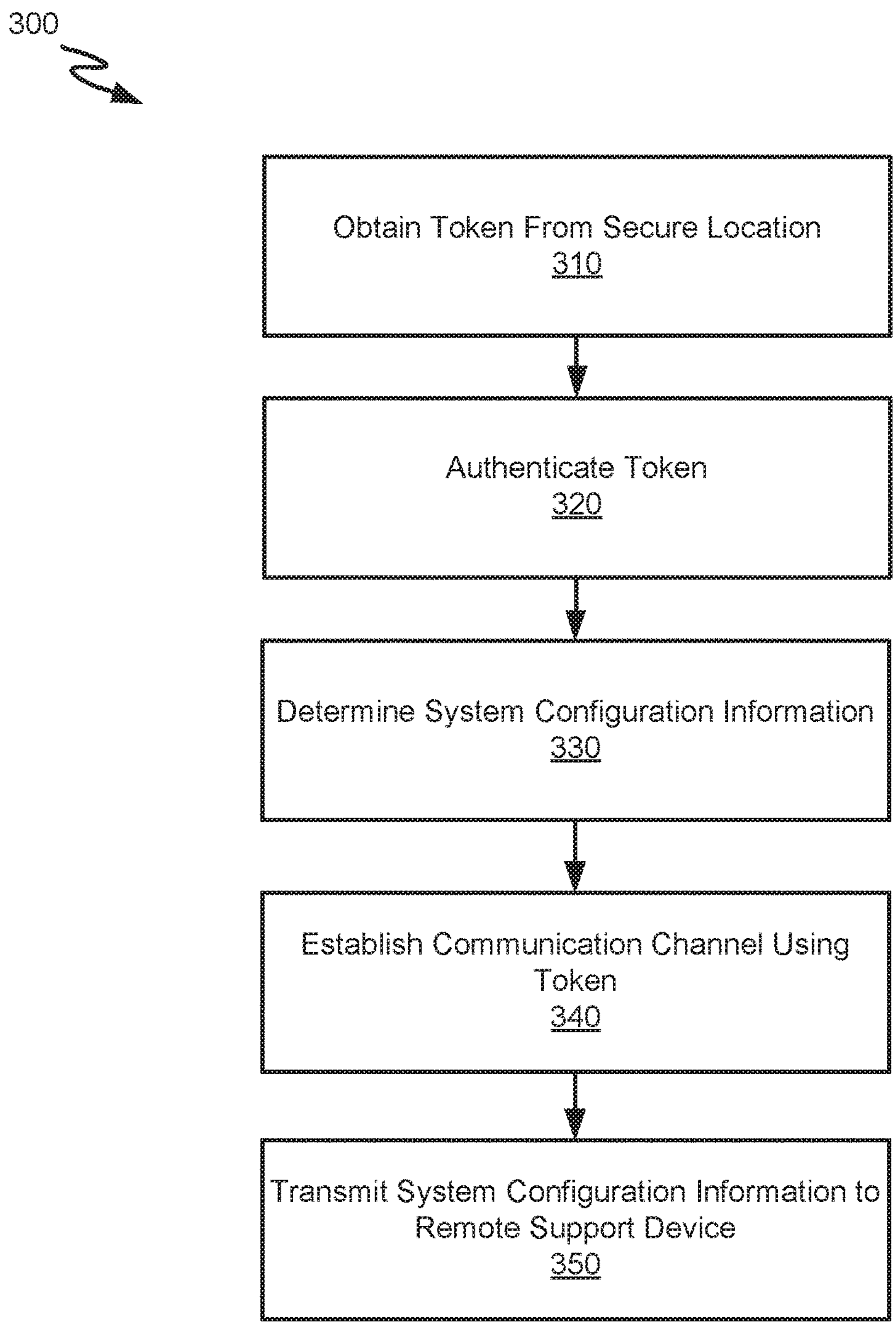
FIG. 3 illustrates example operations for live support integration in a virtual machine based development environment as described herein.

FIG. 3 illustrates a flow chart of example operations 300 for live support integration in a virtual machine based development environment as described herein. The steps included in operations 300 may, for example, be implemented by various components of live support manager 138.

At 310, live support manager 138 obtains a token from a secure location. The token may be stored, for example, on an encrypted network drive, and may comprise data which identifies the user and data which identifies the validity of the token. For example, the token may comprise a unique code which is known by a separate authentication server to be authentic. The token may, for instance, be generated in advance by a security engineer.

At 320, live support manager 138 authenticates the token. The token may be authenticated, for example, by providing the token to a separate authentication server and receiving a response which indicates whether the token is authentic. A successful response means that the token has been "authenticated", and operations continue at 330. Obtaining and authenticating the token may, for instance, be performed by message interface console 204. Otherwise, operations 300 may terminate if live support manager 138 determines that the token is not authentic (e.g., is spoofed, is associated with revoked credentials, or the like).

At 330, live support manager 138 determines system configuration information for user device 120 and dispatcher virtual machine 130. Configuration information may, for instance be determined by configuration inspector 205 and provided to message interface console 204.

At 340, live support manager 138 establishes a secure communication channel with remote support device 160 using the token. The token, which was authenticated at 320, ensures that the communication channel is secure, and that communication channels are not established with untrusted devices. The channel may be established, for example, by message interface console 204.

At 350, live support manager 138 transmits the configuration information to remote support device 160. This may, for example, be performed by message interface console 204. The configuration information may be provided to a support professional using remote support device 160 in order to allow the support professional to tailor messages sent to user device 120 (e.g., commands to be executed by command executor 206) to, for example, respond to technical problems that may arise from a combination of the current configuration of user device 120 and a specific virtual machine in the development environment.

The communication channel may allow a user of dispatcher virtual machine 130 to request technical support from a support professional using remote support device 160. For example, the user may encounter a problem while using dispatcher virtual machine 130, and may be unable to resolve the problem locally. The user may transmit a message requesting technical support to a support professional via message interface console. The user may, for example, describe the problem in a message. The support professional, upon receiving the message, is able to view the configuration information of user device 120 and the development environment deployed thereon provided from dispatcher virtual machine 130, and may use this information to help identify a resolution to the problem. The support professional may respond in the form of messages (i.e. chatting with the user) and/or commands provided to live support manager 138. For example, a support professional may send a command to live support manager 138 which, when executed, modifies a configuration file stored on user device 120. Commands may, for example, be executed by command executor 206.

In some embodiments, the user of dispatcher virtual machine 130 may be shown a status message in message interface console 204 which indicates that a command has been received and is being executed. Otherwise, the user may not see the execution of the command itself, and the dispatcher virtual machine 130 may appear unchanged. For example, if a configuration file is modified by command executor 206 in response to a command received from remote support device 160, message interface console 204 may display a message such as "configuration file is being modified by remote support provider." When the modification is complete, the message interface console 204 may display a message such as "modification of configuration file complete." The user may then return to using the dispatcher virtual machine 130, and identify whether the problem has been resolved.

Figure 4:
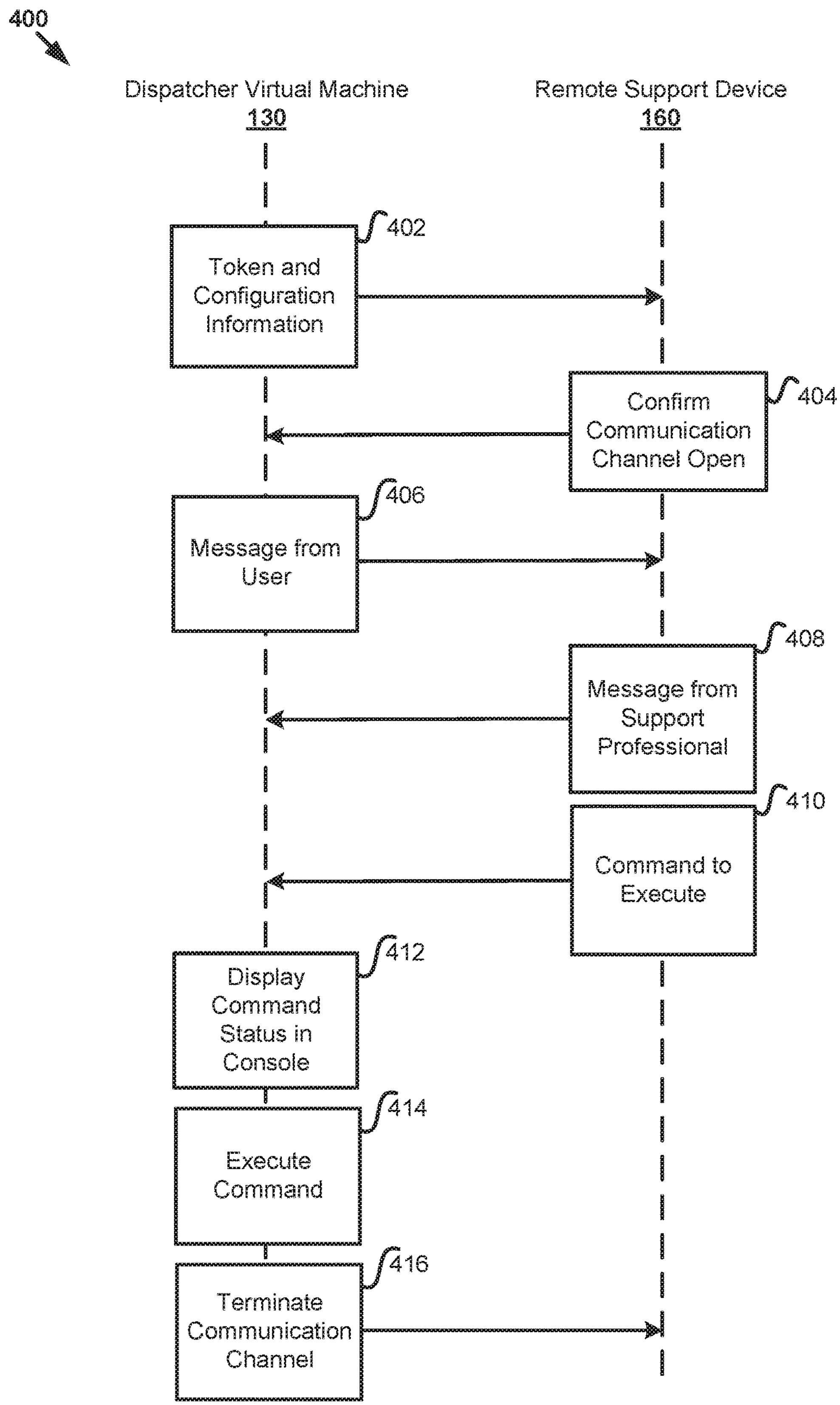
FIG. 4 illustrates a message flow for live support integration in a virtual machine based development environment, according to one embodiment.

FIG. 4 illustrates a message flow 400 for live support integration in a virtual machine based development environment, according to one embodiment.

At 402, dispatcher virtual machine 130 transmits the token and configuration information to remote support device 160. Dispatcher virtual machine may have, for example, obtained and verified the authentication token and identified the configuration information in the manner described above with respect to FIG. 3.

At 404, remote support device 160 confirms that a communication channel has been opened between dispatcher virtual machine 130 and remote support device 160. For example, remote support device 160 may determine that the token is authentic, establish a secure communication channel, and then send a message to dispatcher virtual machine 130 indicating that the communication channel is open.

At 406, dispatcher virtual machine 130 sends a message from a user to remote support device 160. A user may, for example, enter a message describing a technical problem into the user interface of the message interface console 204, and dispatcher virtual machine 130 may transmit this message via the communication channel to remote support device 160.

At 408, remote support device 160 transmits a message from a support professional to dispatcher virtual machine 130. This message may, for example, have been composed by a support professional based on an anlysis of the problem described in the message from the user.

At 410, remote support device 160 transmits a command to dispatcher virtual machine 130. The command may, for example, comprise a support-related command which the support professional believes will remedy the user's problem when executed. For example, the command may, when executed, modify a configuration file stored on user device 120.

At 412, dispatcher virtual machine 130 displays the status of the command in the user interface of message interface console 204. For example, the status may indicate that the command is being executed, and may identify the nature of the command. In the case of a command which modifies a configuration file, the status may indicate that a configuration file is being modified.

At 414, dispatcher virtual machine 130 executes the command. This may involve, for example, taking certain actions such as modifying a configuration file.

At 416, dispatcher virtual machine 130 sends a message to remotre support device 160 which terminates the communication channel. This may be sent, for example, if the user's problem has been resolved, and no further support is needed. If the user finds that the problem has not been resolved, the communication channel may not be terminated so that the user may continue to send messages and request additional support from the support professional.

Figure 5:
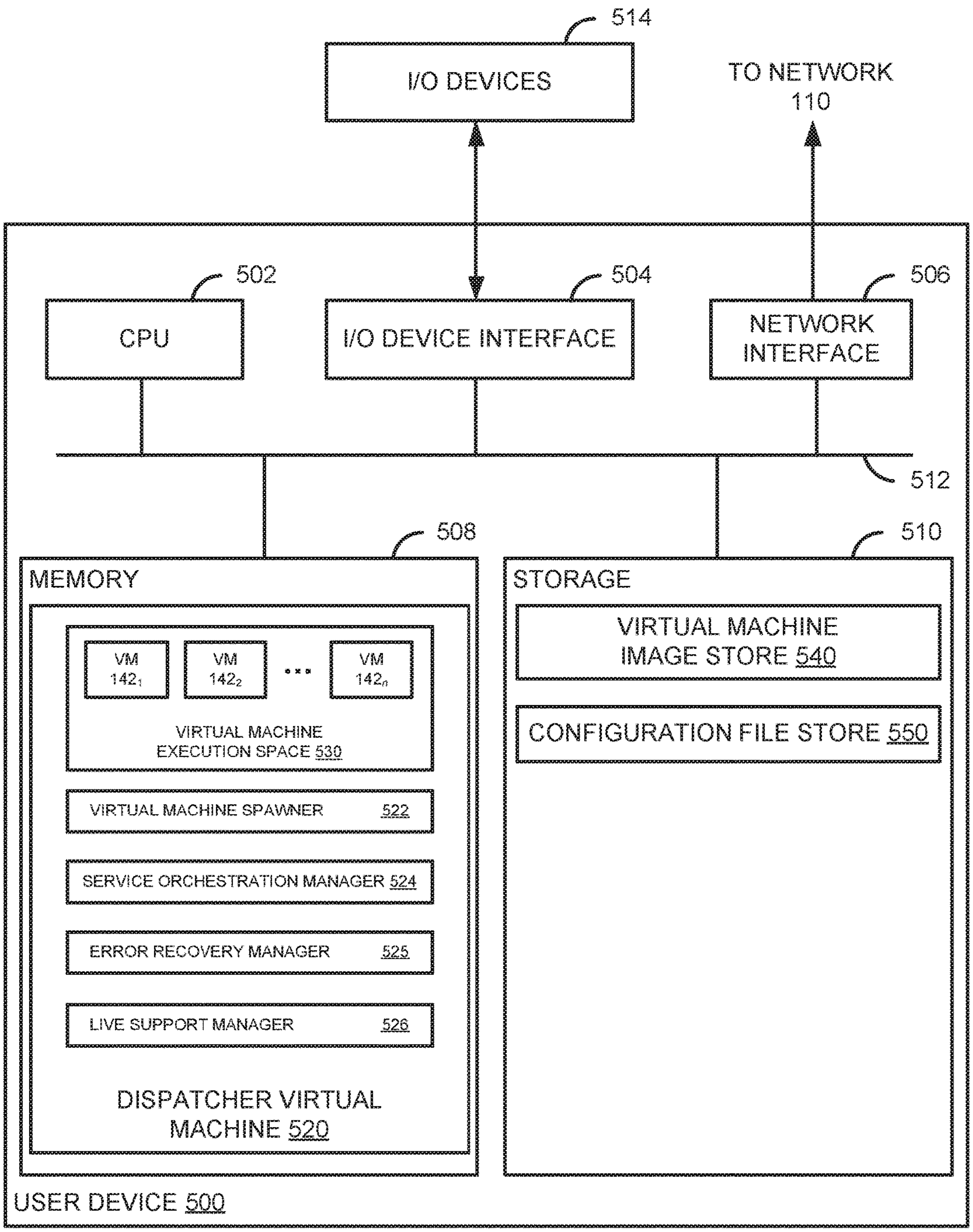
FIG. 5 illustrates an example computing system for live support integration in a virtual machine based development environment, according to one embodiment.

FIG. 5 illustrates a user device 500 that integrates live support in a virtual machine based environment, according to an embodiment. As shown, the system 500 includes, without limitation, a central processing unit (CPU) 502, one or more I/O device interfaces 504 which may allow for the connection of various I/O devices 514 (e.g., keyboards, displays, mouse devices, pen input, etc.) to the system 500, network interface 506, a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

As shown, memory 508 includes a dispatcher virtual machine 520. Dispatcher virtual machine 520 is generally configured to manage the deployment of various components of a development platform on user device 120, as described herein. For example, dispatcher virtual machine 520 may include live support manager 526, which may perform operations described herein for integrating live support in a virtual machine based development environment. Dispatcher virtual machine 520 may also include virtual machine execution space 530, virtual machine spawner 522, service orchestration manager 524, and error recovery manager 525, all of which are described in more detail with respect to FIG. 1 above.

As shown, storage 510 includes virtual machine image store 540 and configuration file store 550, which may be configured to store virtual machine images and configuration files as described herein.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for live support integration in a virtual machine-based development environment, comprising:

obtaining, by a virtual machine, a token from a secure location; and upon determining, by the virtual machine, that the token is authentic:

determining, by the virtual machine, first system configuration information relating to the virtual machine by accessing one or more configuration files relating to the virtual machine;

determining, by the virtual machine, second system configuration information relating to a host device on which the virtual machine is hosted by introspecting into the host device on which the virtual machine is hosted; and establishing, by the virtual machine, a communication channel with a remote support device using the token, by:

transmitting, by the virtual machine, the first system configuration information relating to the virtual machine and the second system configuration information relating to host device on which the virtual machine is hosted to the remote support device; and enabling two-way communication between the virtual machine and the remote support device.

2. The method of claim 1, wherein obtaining the token from the secure location comprises accessing a secure network drive to obtain the token, the token comprising data that identifies a user and data that identifies validity of the token.

3. The method of claim 1, wherein the first system configuration information comprises at least one of:

identifying information of a user currently using the virtual machine; or identifying information of a version of the virtual machine based development environment.

4. The method of claim 1, further comprising:

receiving, by the virtual machine and via the communication channel, one or more commands from the remote support device, wherein the virtual machine executes the one or more commands.

5. The method of claim 4, wherein the one or more commands comprise instructions to modify a configuration file associated with the virtual machine.

6. The method of claim 5, wherein the one or more commands comprise instructions to back up the configuration file associated with the virtual machine prior to modifying the configuration file.

7. The method of claim 5, further comprising:

displaying, by the virtual machine, a status message in a user interface indicating that the configuration file is being modified.

8. A system, comprising:

a processor; and memory storing instructions which, when executed on one or more processors, performs a method for live support integration in a virtual machine-based development environment, the method comprising:

obtaining, by a virtual machine, a token from a secure location; and upon determining, by the virtual machine, that the token is authentic:

determining, by the virtual machine, first system configuration information relating to the virtual machine by accessing one or more configuration files relating to the virtual machine;

determining, by the virtual machine, second system configuration information relating to a host device on which the virtual machine is hosted by introspecting into the host device on which the virtual machine is hosted; and establishing, by the virtual machine, a communication channel with a remote support device using the token, by:

transmitting, by the virtual machine, the first system configuration information relating to the virtual machine and the second system configuration information relating to host device on which the virtual machine is hosted to the remote support device; and enabling two-way communication between the virtual machine and the remote support device.

9. The system of claim 8, wherein obtaining the token from the secure location comprises accessing a secure network drive to obtain the token, the token comprising data that identifies a user and data that identifies validity of the token.

10. The system of claim 8, wherein the first system configuration information comprises at least one of:

identifying information of a user currently using the virtual machine; or identifying information of a version of the virtual machine based development environment.

11. The system of claim 8, wherein the method further comprises:

receiving, by the virtual machine and via the communication channel, one or more commands from the remote support device, wherein the virtual machine executes the one or more commands.

12. The system of claim 11, wherein the one or more commands comprise instructions to modify a configuration file associated with the virtual machine.

13. The system of claim 12, wherein the one or more commands comprise instructions to back up the configuration file associated with the virtual machine prior to modifying the configuration file.

14. The system of claim 12, wherein the method further comprises:

displaying, by the virtual machine, a status message in a user interface indicating that the configuration file is being modified.

15. A non-transitory computer-readable medium comprising instructions which, when executed on one or more processors, performs a method for live support integration in a virtual machine-based development environment, the method comprising:

obtaining, by a virtual machine, a token from a secure location; and upon determining, by the virtual machine, that the token is authentic:

determining, by the virtual machine, first system configuration information relating to the virtual machine by accessing one or more configuration files relating to the virtual machine;

determining, by the virtual machine, second system configuration information relating to a host device on which the virtual machine is hosted by introspecting into the host device on which the virtual machine is hosted; and establishing, by the virtual machine, a communication channel with a remote support device using the token, by:

transmitting, by the virtual machine, the first system configuration information relating to the virtual machine and the second system configuration information relating to host device on which the virtual machine is hosted to the remote support device; and enabling two-way communication between the virtual machine and the remote support device.

16. The non-transitory computer-readable medium of claim 15, wherein obtaining the token from the secure location comprises accessing a secure network drive to obtain the token, the token comprising data that identifies a user and data that identifies validity of the token.

17. The non-transitory computer-readable medium of claim 15, wherein the first system configuration information comprises at least one of:

identifying information of a user currently using the virtual machine; or identifying information of a version of the virtual machine based development environment.

18. The non-transitory computer-readable medium of claim 15, wherein the method further comprises:

receiving, by the virtual machine and via the communication channel, one or more commands from the remote support device, wherein the virtual machine executes the one or more commands.

19. The non-transitory computer-readable medium of claim 18, wherein the one or more commands comprise instructions to modify a configuration file associated with the virtual machine.

20. The non-transitory computer-readable medium of claim 19, wherein the one or more commands comprise instructions to back up the configuration file associated with the virtual machine prior to modifying the configuration file.

21. The non-transitory computer-readable medium of claim 19, wherein the method further comprises:

displaying, by the virtual machine, a status message in a user interface indicating that the configuration file is being modified.

* * * * *